United States Patent [19]
Metrick et al.

[11] Patent Number: 5,468,792
[45] Date of Patent: Nov. 21, 1995

[54] CLARIFYING COMPOSITIONS, PROCESS FOR MAKING AND POLYOLEFIN COMPOSITIONS CONTAINING THEM

[75] Inventors: Joseph Metrick, Wilmington; Jeffrey D. Abata, Newark, both of Del.

[73] Assignee: Montell North America Inc., Wilmington, Del.

[21] Appl. No.: 435,247

[22] Filed: May 5, 1995

Related U.S. Application Data

[63] Continuation of Ser. No. 145,287, Oct. 29, 1993, abandoned.
[51] Int. Cl.$^6$ .............................. C08K 5/15; C08K 5/51; C09K 15/32
[52] U.S. Cl. ...................... 524/108; 252/400.24; 524/128
[58] Field of Search ..................... 524/108, 128; 252/400.24

[56] References Cited

U.S. PATENT DOCUMENTS

| | | | |
|---|---|---|---|
| 4,016,118 | 4/1977 | Hamada et al. | 260/17.4 |
| 4,388,119 | 6/1983 | Uchiyama | 106/316 |
| 4,483,952 | 11/1984 | Uchiyama | 524/108 |
| 5,001,179 | 3/1991 | Kauffman et al. | 524/275 |
| 5,077,328 | 12/1991 | Haruna et al. | 524/232 |

FOREIGN PATENT DOCUMENTS 2261667  5/1993  United Kingdom.

*Primary Examiner*—Peter D. Mulcahy

[57] ABSTRACT

Disclosed is a clarifying composition mainly containing a phosphonite stabilizer composition, the main component of which is tetrakis-(2,4-di-tert-butylphenyl)-4,4-biphenylene diphosphite, with certain sorbitol based compounds having a melting point of greater than 200° C., a process for preparing the clarifying compositions and polyolefin compositions containing the clarifying composition.

9 Claims, No Drawings

CLARIFYING COMPOSITIONS, PROCESS FOR MAKING AND POLYOLEFIN COMPOSITIONS CONTAINING THEM

This application is a continuation, of application Ser. No. 08/145,287, filed Oct. 29, 1983 now abandoned.

FIELD OF THE INVENTION

The present invention relates to a clarifying composition, and more specifically, to a clarifying composition which is useful as an additive for improving the stabilization and transparency of crystalline propylene polymer materials at lower processing temperatures.

BACKGROUND OF THE INVENTION

Typically, crystalline propylene polymer materials, such as polypropylene and propylene polymer based copolymers, have found extensive use in various formed articles, such as injection-molded articles, blow-molded articles, films, sheets and fibers, because of their excellent mechanical properties. However, due to their nature, crystalline propylene polymer materials have the problem of being poor in transparency. To improve the transparency of polyolefins, nucleating or clarifying agents are generally incorporated therein such as described in U.S. Pat. No. 4,388,119 which discloses a composition consisting essentially of a solid powdery dibenzylidene sorbitol coated with a higher fatty acid.

U.S. Pat. No. 5,001,179 discloses the use of a dibenzylidene sorbitol based compound and a cyclodextrin in a crystalline polyolefin type composition to obtain transparency and odor-non-emitting properties.

While incorporating the sorbitol based compounds in polyolefin resins improves the transparency of the polyolefin resin, high processing temperatures must be used in order to melt and properly disperse the sorbitol-based compound which have melting points of at least 220° C.

Low processing temperatures are preferred in the industry to prevent the degradation or decomposition of the propylene polymer material. However, at lower processing temperatures white specks of unmelted and poorly dispersed sorbitol-based compounds are found in the resulting molded articles because the processing temperature is lower than the melting points of the sorbitol based compounds. Thus, there is a desire to find clarifying agents which can be used at lower processing temperatures, without the problem of obtaining white specks in the final product.

SUMMARY OF THE INVENTION

It has been found in accordance with the present invention that by forming an intimate mixture of a particular phosphonite stabilizer with certain sorbitol-based clarifiers, the melting point of the sorbitol-based compound is depressed or lowered, which enables the polyolefin composition containing sorbitol-based compound to be processed at a lower temperature and provides products without the white specking due to unmelted or poorly dispersed additives.

According to one embodiment of the present invention there is provided a clarifying composition consisting essentially of (a) from 5% to 90%, preferably 5 to 50%, most preferably 5 to 30% of a phosphonite stabilizer composition, the main component of which is tetrakis-(2,4-di-tert-butyl-phenyl)-4,4-biphenylene diphosphite and (b) from 95% to 10%, preferably 95 to 50% and most preferably 95 to 70% of a sorbitol based compound having a melting point greater than 200° C.

In another embodiment of the present invention there is provided a polyolefin composition comprising (A) 100 parts of a propylene polymer material and (B) from 0.05 to 1.0 parts of a clarifying composition consisting essentially of (a) a phosphonite stabilizer composition, the main component of which is tetrakis-(2,4-di-tert-butylphenyl)-4,4-biphenylene diphosphite, and (b) a sorbitol-based compound having a melting point greater than 200° C.

In a further embodiment of the present invention there is provided a process for preparing the clarifying composition.

Phosphonite stabilizer composition means the compositions marketed under the trademark Sandostab P-EPQ by Sandoz Chemicals Ltd., the main component of which is tetrakis-(2,4-di-tert-butylphenyl)-4,4-biphenylene diphosphite. Such compositions are commercially available.

DETAILED DESCRIPTION OF THE INVENTION

All parts and percentages used in this application are by weight unless otherwise specified. Ambient or room temperature is approximately 25° C.

The sorbitol-based compounds useful in the compositions of the present invention are those sorbitol compounds having a melting point of greater than 200° C. Suitable examples of the sorbitol compounds include di-benzylidene sorbitol, bis(p-methylbenzylidene) sorbitol, bis(3,5-dimethylbenzylidene) sorbitol and bis(p-ethylbenzylidene)sorbitol.

The propylene polymer material is selected from the group consisting of a crystalline homopolymer of propylene; (ii) a random copolymer of propylene and an olefin selected from the group consisting of ethylene and $C_4$–$C_{10}$ alpha-olefins, provided that, when the olefin is ethylene, the maximum polymerized ethylene content is about 10%, preferably about 4%, and when the olefin is a $C_4$–$C_{10}$ alpha-olefin, the maximum polymerized content thereof is about 20%, preferably about 16%; or (iii) a random terpolymer of propylene and an olefin selected from the group consisting of ethylene and $C_4$–$C_8$ alpha-olefins, provided that the maximum polymerized $C_4$–$C_8$ alpha-olefin content is about 20%, preferably about 16%, and, when ethylene is one of the olefins, the maximum polymerized ethylene content is about 5%, preferably about 4%, with a maximum comonomer content of 25%.

Suitable alpha-olefins of the formula $CH_2=CHR$ include butene-1, pentene-1, 4-methylpentene-1, hexene-1, and octene-1.

The clarifying composition of the present invention is prepared by adding a sorbitol compound to a pre-formed solution of a phosphonite stabilizer composition, the main component of which is tetrakis-(2,4-di-tert-butyl-phenyl)-4,4-biphenylene diphosphite, dissolved in an inert solvent at room temperature or at a temperature up to 65° C. The mixture is stirred, thus forming a slurry. The solvent is evaporated, and the resulting product is dried and pulverized to a fine powder.

The inert solvent used in the process of this invention should be one in which the phosphonite stabilizer composition, the main component of which is tetrakis-(2,4-di-tert-butylphenyl)-4,4-biphenylene diphosphite, is soluble and the sorbitol compound is substantially insoluble. Preferably, the inert solvent is acetone or a hydrocarbon solvent such as hexane, heptane, xylene, toluene and petroleum ethers. Most preferably, the inert solvent is a low boiling one such as heptane.

When the clarifying composition of the present invention is incorporated into a propylene polymer material at low processing temperatures, the transparency of the resin is improved, with little or no evidence of white specks from unmelted and poorly dispersed additives.

The clarifying composition of this invention can be incorporated into a propylene polymer material by conventional mixing procedures.

A propylene polymer material containing the nucleating composition of this invention can be used in preparing films, sheets, fibers and molded articles such as containers for foodstuff and cosmetics.

The present invention will be illustrated in greater detail with reference to the examples of the invention set forth below.

EXAMPLE 1

A clarifying composition of Sandostab P-EPQ phosphonite stabilizer composition, the main component of which is tetrakis-(2,4-di-tert-butylphenyl)-4,4-biphenylene diphosphite, and Millad 3905 dibenzylidene sorbitol, in a 1:4.4 ratio, was prepared by dissolving 22.7g of the phosphonite composition in 300 ml of heptane at room temperature. Then 99.88 g of Millad 3905 dibenzylidene sorbitol was added to the solution thereby forming a slurry. Stirring continued for 15 minutes, then the heptane was removed under vacuum at a temperature of below 65° C. The resultant clarifying composition is dried and pulverized to a fine powder.

The data showing the decrease in the melting point in the sorbitol additive is set forth below in Table 1.

EXAMPLES 2–5

A clarifying composition was prepared according to the method described in Example 1 using the same ingredients, except varying the ratio of the components as set forth below in Table 1.

The data showing the decrease in the melting point in the sorbitol additive is set forth below in Table 1.

EXAMPLE 6

A clarifying composition was prepared according to Example 1, except that Millad 3940 bis(p-methylbenzylidene) sorbitol was used instead of Millad 3905 sorbitol.

The data showing the decrease in the melting point in the sorbitol additive is set forth below in Table 1.

EXAMPLES 7–10

A clarifying composition was prepared according to the method described in Example 6 using the same ingredients, except varying the ratio of the components as set forth below in Table 1.

The data showing the decrease in the melting point in the sorbitol additive is set forth below in Table 1.

EXAMPLE 11

A clarifying composition was prepared according to Example 1, except that NC-4 bis(p-ethylbenzylidene) sorbitol was used instead of Millad 3905 sorbitol.

The data showing the decrease in the melting point in the sorbitol additive is set forth below in Table 1.

EXAMPLES 12–15

A clarifying composition was prepared according to the method described in Example 11 using the same ingredients, except varying the ratio of the components as set forth below in Table 1.

The data showing the decrease in the melting point in the sorbitol additive is set forth below in Table 1.

The melting points reported below in Table 1 were obtained using a capillary type apparatus which allows the temperature to be raised incrementally by degree.

TABLE 1

| Example | Ratio of sorbitol:Sandostab P-EPQ | M.Pt, C. |
|---|---|---|
| Millad 3905 | — | 225 |
| 1 | 4.4 | 178 |
| 2 | 9 | 176 |
| 3 | 2.3 | 181 |
| 4 | 0.2 | 180 |
| 5 | 0.1 | 170 |
| Millad 3940 | — | 250 |
| 6 | 4 | 199 |
| 7 | 9 | 196 |
| 8 | 2.3 | 202 |
| 9 | 0.4 | 212 |
| 10 | 0.1 | 195 |
| NC-4 | — | 225 |
| 11 | 4 | 207 |
| 12 | 9 | 201 |
| 13 | 2.3 | 208 |
| 14 | 0.1 | 155 |

It can be seen from the data in Table 1 that the melting points of the clarifying compositions of the present invention containing a sorbitol-based compound are significantly lower than the melting points of the sorbitol-based compound alone.

EXAMPLE 15 and 16

The examples illustrate the use of a clarifying composition of the present invention consisting of Sandostab P-EPQ phosphonite stabilizer composition and Millad 3905 dibenzylidene sorbitol, (0.05:0.22 ratio and 0.8:0.22 ratio, respectively), in a propylene polymer material composition set forth below in Table 2 wherein these compositions are referred to as Comp. I and Comp. II, respectively. The ingredients of composition were mixed in a Henschel mill for approximately 5 min., at ambient temperature.

Then 5"×5"×⅛" plaques were injection molded from the mixture. The plaques were molded at 425° F.

TABLE 2

| | Examples | | |
| Ingredients | 15 | 16 | Comparative 1 |
|---|---|---|---|
| Polymer A[1] | 100 | 100 | 100 |
| CaSt[2] | 0.1 | 0.1 | 0.1 |
| GMS[3] | 0.15 | 0.15 | 0.15 |
| Nucleator 1[4] | — | — | 0.22 |
| Comp. I | 0.27 | — | — |
| Comp. II | — | 0.30 | — |
| Irganox 1010[5] | 0.05 | 0.05 | 0.05 |
| Irganox 1076[6] | 0.025 | 0.025 | 0.025 |
| # of specks | 0 | 1 | 6 |

[1]Polymer A = an ethylene-propylene random copolymer having a melt flow rate of 12, and an ethylene content of 3.1%.
[2]CaSt = calcium stearate.
[3]GMS = glycerol monostearate.
[4]Nucleator 1 = Millad 3905 di(benzylidene)sorbitol nucleator.
[5]Tetrakis[methylene(3,5-di-t-butyl-4-hydroxyhydro-cinnamate)-methane] stabilizer.
[6]Octadecyl 3,5-bis(1,1-dimethylethyl-4-hydroxybenzene)-propanoate.

It can be seen from the data in Table 2 that the clarifying compositions of examples 15 and 16 of the present invention when incorporated in the polyolefin resin clearly provides less white specks at lower processing temperatures as compared to the high number of white specks observed in comparative example 1 when the sorbitol is added as a separate component into the polyolefin resin.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A clarifying composition consisting essentially of a mixture of (a) from 5% to 90% by weight of the total weight of the clarifying composition of a phosphonite stabilizer composition, the main component of which is tetrakis-(2,4-di-tert-butylphenyl)-4,4-biphenylene diphosphite, and (b) from 95% to 10% by weight of the total weight of the clarifying composition of a sorbitol-based compound having a melting point greater than 200° C., such that the amount of phosphonite stabilizer Composition is effective to depress the melting point of said sorbitol-based compound.

2. The clarifying composition of claim 1, wherein the sorbitol-based compound is selected from the group consisting of dibenzylidene sorbitol, bis(p-methylbenzylidene) sorbitol, bis(3,5-dimethylbenzylidene) sorbitol and bis(p-ethylbenzylidene) sorbitol.

3. The clarifying composition of claim 2, wherein the sorbitol-based compound is dibenzylidene sorbitol.

4. The clarifying composition of claim 2, wherein the sorbitol-based compound is bis(p-methylbenzylidene) sorbitol.

5. A polyolefin composition comprising (A) 100 parts of a propylene polymer material and (B) from 0.05 to 1 parts of a clarifying composition consisting essentially of a mixture of (a) from 5% to 90% by weight of the total weight of the clarifying composition of a phosphonite stabilizer composition, the main component of which is tetrakis-(2,4-di-tert-butylphenyl)-4,4-biphenylene diphosphite, and (b) from 95% to 10% by weight of the total weight of the clarifying composition of a sorbitol-based compound having a melting point greater than 200° C., such that the amount of phosphonite stabilizer composition is effective to depress the melting point of said sorbitol-based compound.

6. The composition of claim 5, wherein the propylene polymer material of component (A) is a homopolymer of propylene, or a copolymer of propylene and ethylene or a $C_{4-10}$ alpha-olefin.

7. The composition of claim 5, wherein the sorbitol-based compound is selected from the group consisting of dibenzylidene sorbitol, bis(p-methylbenzylidene) sorbitol, bis(3,5-dimethylbenzylidene) sorbitol and bis(p-ethylbenzylidene) sorbitol.

8. The composition of claim 7, wherein the sorbitol-based compound is dibenzylidene sorbitol.

9. The composition of claim 7, wherein the sorbitol-based compound is bis(p-methylbenzylidene) sorbitol.

* * * * *